Patented July 28, 1953

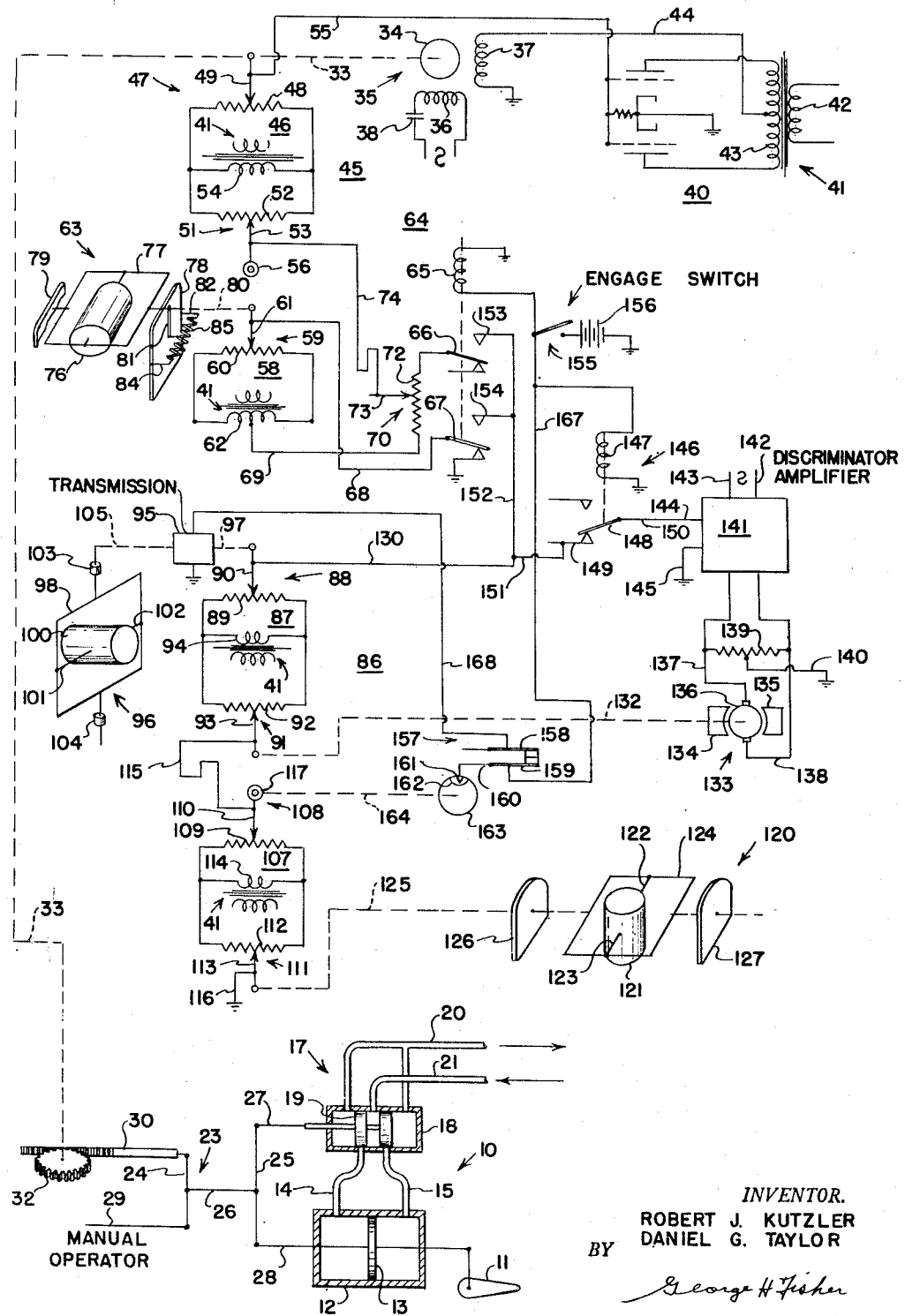

2,646,947

UNITED STATES PATENT OFFICE 2,646,947

AUTOMATIC STEERING APPARATUS

Robert J. Kutzler, Richfield, and Daniel G. Taylor, Minneapolis, Minn., assignors to Minneapolis-Honeywell Regulator Company, Minneapolis, Minn., a corporation of Delaware Application January 8, 1951, Serial No. 204,966

9 Claims. (Cl. 244—77)

This invention relates to stabilizing devices of the type concerned with stabilizing an aircraft in flight. Aircraft, in many instances, have a vertical fin or stabilizer that aerodynamically provides directional stability to prevent the craft from oscillating about the yaw axis. Where the aircraft lacks a vertical fin of sufficient size or proportions to provide proper directional stability, such deficiency may be offset by operating the rudder surface whereby dynamic stability is provided.

Such operation of the rudder may be effected through a reciprocating type of hydraulic or fluid motor having a conventional slidable control valve. The valve of the hydraulic motor, during manual control of the craft, may be manually displaced. On the other hand, the valve may be displaced automatically upon the craft changing heading by an electric motor that is automatically controlled, to mechanically provide dynamic stability for the aircraft even while the valve may be also manually controlled.

The aircraft may also be supplied with an automatic pilot, to maintain the craft heading against external disturbing forces, which also has an electric motor for positioning the valve, of the hydraulic motor. The autopilot may include conventionally a compass or directional gyroscope or similar devices for automatically stabilizing the direction of flight of the aircraft.

It is an object of this invention to provide a novel relationship between a dynamic means for damping and suppressing oscillations of an aircraft, resulting from its construction, and an automatic pilot which opposes the action of external forces tending to change the craft heading from a selected heading.

It is a further object of this invention to provide a simplified dynamically operative stabilizing control for an aircraft.

A further object of this invention is to provide a dynamically operative stabilizing control that functions during manual control of flight and autopilot control of flight of an aircraft.

It is a further object of this invention to effect improved automatic dynamic stabilization of an aircraft by operating a control surface thereof under control of a device responsive to movement of said craft about an axis.

A further object of this invention is to embody in the above device a gyroscope responsive to the rate of change of heading of said craft.

Other objects and advantages will be apparent as the invention is more fully disclosed. The invention may be more fully understood by referring to the following description in conjunction with the accompanying drawing which illustrates one embodiment of the invention.

The sole figure is a diagrammatic view of a heading control apparatus for an aircraft in which the present invention is utilized.

The form of the invention illustrated in the figure, by way of example, includes means for controlling a servomotor in one instance, in accordance with the rate of change of heading of the aircraft while manual operation of the servomotor is also permitted so that the rate of turn responsive device which is acted upon by the dynamic action of the aircraft effects through the servomotor an operation of a control surface to effect stability of the aircraft and correct for the inherent dynamic action of the aircraft. Alternatively, this same rate of turn responsive device is included along with a position maintaining device in apparatus to automatically maintain the attitude of the craft at a selected value, through control of the same servomotor.

Referring to the drawing, the apparatus includes a fluid operated servomotor 10 for operating a rudder 11 of a dirigible craft such as an aircraft. The servomotor 10 conventionally includes a cylinder 12 housing a power piston 13, which is displaceable in either direction from a midposition to operate the control surface 11. Communicating with opposed ends of cylinder 12 are conducting pipes 14, 15 extending from a control valve 17. The control valve 17 comprises a valve body 18 which houses an adjustable cylindrical piston 19 of the double land type. The adjustment of control valve 19 serves to connect pressure inlet line 21 with conducting pipe 14 and connect conducting pipe 15 with exhaust line 20. Alternatively the adjustment of control valve 19 connects inlet pipe 21 with conducting pipe 15 and connects conducting pipe 14 with exhaust pipe 20.

The position of control valve piston 19 is controlled by a lever-linkage arrangement 23 comprising a differential lever 24, differential lever 25, and a link 26 connecting the mid-points of the levers. One end of lever 25 is connected by a pivoted rod 27 to a piston valve 19. The opposite end of lever 25 is connected to a pivoted follow-up rod 28 additionally connected to piston 13 of the servomotor 10. One end of lever 24 has a pivoted manually operable rod 29 extending therefrom and the opposite end of lever 24 is pivotally connected to a rack 30. By means of the levers 24, 25 and link 26 the rod 27 is positioned in accordance with the resultant of three controlling quantities. The rack 30 is positioned by a gear 32 in mesh therewith which gear is driven by an output shaft 33 extending from rotor 34 of aircraft dynamic damper induction motor 35.

The motor 35 may be a capacitor type induction motor having a line winding 36 and an amplifier energized winding 37. The line winding 36 is connected in series with a phasing capacitor 38 to a source of alternating voltage. The winding 37 is energized from the output of a conventional phase sensitive or phase discriminator amplifier 40. The amplifier 40 may be of the type as shown in the patent to Beers, 2,020,275. For simplicity it is here shown as consisting merely of two sets of triode tube elements. The two plates are connected to the opposed ends of a secondary winding 43 of a transformer 41 whose primary winding 42 is connected to the source of alternating voltage. The two cathodes are connected together and thence to ground. The two grids are connected together. A conductor 44 extends from a center tap of the secondary winding 43 to one end of motor winding 37, the opposite end of winding 37 being connected to ground which is common with the ground of the two cathodes. The direction of rotation of rotor 34 of motor 35 depends upon which set of tube elements are operating and this depends upon the phase relationship between the alternating voltage between the grid and cathodes of the triodes and the voltage across the primary winding 42 of transformer 41.

The grids and cathodes of amplifier 40 are connected to a control or first balanceable network 45 which provides control signals to effect operation of amplifier 40.

Network 45 includes a Wheatstone bridge 46 having a potentiometer 47 comprising a resistor 48 and a slider 49; a trim-potentiometer 51 comprising a resistor 52 and a slider 53; and a secondary winding 54 of transformer 41. The transformer 41 of network 46 is common to the transformer for the amplifier 40 since a single primary winding of a transformer may supply a plurality of secondaries. Thus in the further networks to be described, the transformer 41 will be common to them also. Resistors 48, 52 are connected in parallel across secondary 54. A conductor 55 extends from the grids of the amplifier 40 to slider 49. Slider 49 is positioned along resistor 48 from the mid-point thereof by output shaft 33 of dynamic damper motor 35. Slider 53 is provided with a suitable knob 56 whereby it may be manually positioned along resistor 52.

Balanceable network 45 includes a rate gyro network 58 comprising a potentiometer 59 having a resistor 60 and a slider 61 and secondary winding 62 of transformer 41. The resistor 60 is connected across the secondary winding 62. Slider 61 is positioned along resistor 60 from the midpoint thereof by a rate of turn gyroscope 63.

Associated with the network 58 is an autopilot engage relay 64. Relay 64 is of the double arm double throw type comprising an operating coil 65 and arms 66, 67. Each arm coacts with its individual out contact and individual in contact. Relay arm 67 normally engages its grounded out contact. A conductor 68 extends from relay arm 67 to slider 61. A conductor 69 extends from a center tap of a secondary winding 62 in series with a voltage divider 70 to slider 53 of network 46.

The voltage divider 70 comprises a resistor 72 and an adjustable slider 73. One end of resistor 72 is connected to conductor 69 and the opposite end of resistor 72 is connected to relay arm 66. A conductor 74 extends from slider 73 to slider 53 of network 46.

The dynamic damper of oscillations of the aircraft is completed by the rate of turn gyroscope 63 which is of the conventional type having a rotor 76 rotatably supported in a gimbal ring 77 for rotation about a horizontal axis. The gimbal ring 77 in turn is supported in pedestal bearings 78, 79, the latter only partially shown, for angular movement about a horizontal axis at right angles to the spin axis of the rotor 76. Extending from one of the trunnions of gimbal ring 77 is an operating connection 80 for positioning slider 61 along resistor 60. Depending from the operating connection 80 adjacent pedestal bearing 78 is an arm 81 which is connected approximate to the mid-point of a biasing spring 85. The ends of spring 85 are carried by arms 82, 84 extending laterally from the fixed bearing 78. The arrangement of gyroscope 63 is such that upon movement of the craft about its yaw or turn axis the gyroscope precesses about the trunnion supports in bearings 78, 79.

An autopilot network 86 may selectively be placed in series with the damper network 45 to automatically stabilize the craft on a given heading. Means by which such connection is effected will be subsequently described. Network 86 includes a Wheatstone bridge 87 comprising a yaw attitude potentiometer 88 having a resistor 89, a slider 90; a centering or rebalancing potentiometer 91 having a resistor 92 and a slider 93; and a secondary winding 94 of transformer 41. Resistors 89 and 92 are connected parallel across secondary winding 94. Slider 90 is positioned along resistor 89 in accordance with the magnitude of change in attitude of the craft about the turn or yaw axis which is detected by a directional gyroscope 96.

Gyroscope 96 comprises a casing 100 which houses a rotor (not shown) for rotation about a horizontal axis. The casing in turn is supported by trunnions 101, 102 in an outer vertical gimbal ring 98 for rotation about an axis at right angles to the rotor spin axis. The vertical gimbal ring 98 is supported in suitable bearings 103, 104 and movement of the outer gimbal ring 98 upon change in heading of the craft is transmitted by operating connection 105 through a directional transmission device 95 and operating connection 97 to slider 90.

The device 95 permits movement of slider 90 from gyroscope 96 during stabilization of heading but prevents such movement during manual changes in heading through the automatic pilot and may be similar to that disclosed in an application of Paul F. Shivers, Serial No. 726,008, filed February 3, 1947, or like the directional arm lock disclosed in Figure 13 in the application of Willis H. Gille, Serial No. 447,989, filed June 22, 1942. When the directional arm lock of the Gille application is utilized, the arm lock will be controlled from out contacts of a normally energized relay which is energized when stabilization from the directional gyro 96 is utilized. The transmission device 95 when deenergized prevents adjustment of slider 90 by gyroscope 96 during selective changes in heading of the craft. Slider 93 is positioned along resistor 92 by motor operated means 132 whose operating means will be subsequently described.

Returning to the network 86, the network additionally includes a balanceable Wheatstone bridge 107 having a manually operable aircraft turn control potentiometer 108 which includes a resistor 109 and a slider 110; a vertical gyro roll attitude potentiometer 111 having a resistor 112 and a slider 113; and a secondary winding 114 of transformer 41. Resistors 109 and 112 are connected in parallel across the secondary winding 114. A conductor 115 extends from slider 110 to slider 93 of potentiometer 91. A ground conductor 116 extends from slider 113. Slider 110 is positioned along resistor 109 from the midpoint thereof by a manually operable turn control knob 117. Slider 113 is positioned along resistor 112 from the midpoint thereof by a vertical gyroscope 120 upon movement of the craft about its roll axis.

Vertical gyroscope 120 is of the conventional type having its rotor not shown supported in a casing 121 for rotation about a vertical spin axis. The casing 121 is supported by trunnions 122, 123 in an outer gimbal ring 124 which is cross trunnioned about axis 125 in pedestal bearings 126, 127. Upon movement of the craft about the roll axis gimbal 124 tilts about the axis 125 which tilt is communicated to slider 113 to position slider 113 along resistor 112.

Any unbalance in network 86 results in a voltage appearing between slider 90 and slider 113. This resultant voltage, during operation of servomotor 10 from the manual operator 29, results in a repositioning of slider 93 to balance the second network 86. The operation of slider 93 is provided by the following means. Slider 93 is positioned by a suitable operating connection 132 extending from a reversible direct current rebalancing motor 133. The motor 133 may be provided with a permanent magnet field derived from permanent magnets 134, 135. The motor 133 includes an armature 136 having one brush connected to a conductor 137 and the other brush connected to a conductor 138. Across the conductors 137 and 138 is a resistor 139 having a center tap connected by conductor 140 to ground. The conductors 137 and 138 are connected to a source of direct voltage through relays alternatively operated by an amplifier 141.

The amplifier 141 is of the phase sensitive or the phase discriminator type having alternating voltage input connections 142, 143 connected to the source of voltage and alternating voltage signal input connections 144, 145 connected to a source of control signal voltage. One or the other of the relays in amplifier 141 are energized depending upon the phase relationship of the control signal across connections 144, 145 with respect to the alternating voltage across the supply connections 142, 143. The amplifier may be such as disclosed in the patent to Gille et al. 2,425,733 or Hamby 2,466,702 wherein in the latter conductor 220 and conductor 222 are connected to the D. C. supply voltage source and conductors 224 and 226 correspond with conductors 137 and 138 herein.

The application of a control signal to amplifier 141 is controlled by a relay 146. Relay 146 has an operating coil 147 and a single arm 148 normally engaged with an out contact 149. A conductor 150 extends from relay arm 148 to input connection 144. The other input connection 145 is connected to ground. A conductor 151 extends from conductor 130 which is connected to slider 90 to out contact 149 of relay 146. It is thus apparent that with the relay coil 147 unenergized a resulting signal in network 86 due to unbalance thereof is applied to amplifier 141. Amplifier 141 effects closing of one or the other of its relays to effect rotation of network rebalancing motor 133. Motor 133 in turn through its operating means 132 positions slider 93 to effect rebalance of second network 86.

In order to effect a combination of networks 45 and 86, there is provided in parallel with conductor 151 a conductor 152 which extends from conductor 130 to out contact 153 of relay arm 66 and in contact 154 of relay arm 67.

The operating coil 65 of relay 64 and the operating coil 147 of relay 146 have their energization controlled by a single pole single throw switch 155 which is placed between them and a source of direct voltage such as battery 156. In series with the single pole double throw switch 155 and effective to control energization of the transmission means 95 is a directional gyro locking switch 157. This switch 157 includes a fixed contact 158 and a pivoted contact 159. Contact 159 is carried at one end of lever 160 pivoted intermediate its ends. The opposite end of lever 160 has a lateral extending portion 161 which engages a notch 162 in a disc 163. Disc 163 is carried on the spindle 164 of turn control knob 117. It is apparent that upon rotation of knob 117 in either direction the cam 163 is rotated so that the portion 161 rides up out of the notch 162 to thereby rotate lever 160 in a clockwise direction to separate the contacts 158, 159. The separation of these contacts breaks the energizing circuit to transmission means 95 to disable gyroscope 96 from operating slider 90.

Use is made of the rate of turn gyroscope 93 as a control device in two configurations for controlling the hydraulic servomotor 10. In one configuration the pilot adjusts directly the manual operator 29 to operate servomotor 10 to control the position of rudder 11. In the other configuration, the aircraft is stabilized on a select heading by means of the directional gyroscope 96.

During manual flight, the engage switch 155 is in its unoperated position as shown. At this time the operating coils 65 and 147 of relay 64 and 146 are unenergized. Also the transmission means 95 has its circuit broken so that the directional gyro operated slider 90 may be returned to its center position as the arrangement of the aforesaid Shivers application or may be held against further movement from directional gyroscope 96 as in the aforesaid Gille application.

If the aircraft tends to change heading, such change in heading is reflected in the precession of the rate of turn gyroscope 63 depending upon the rate of change of heading. This precession of gyro 63 adjusts slider 61 to change its potential with respect to the center tap of secondary winding 62. Slider 61 is connected through conductor 68, relay arm 67 to ground and thence to the ground of the cathodes of dynamic damper amplifier 40. The center tap of secondary winding 62 is connected by conductor 69 and voltage divider resistance 72, conductor 74, network 46, conductor 55, to the grids of amplifier 40 whereby a control signal is applied to the amplifier. The amplifier 40 effects energization of the motor winding 37 to set up a rotating field whereby rotor 34 is rotated. The rotor 34 displaces the slider 49 whereby a voltage is derived between slider 49 and slider 53 equal and opposite to the voltage between slider 61 and the center tap of secondary winding 62 to balance network 45. The rotor 34 additionally through the drive connection 33, gear 32, and rack 30 operates the lever-linkage arrangement 23 to displace the control valve 19. The valve as displaced permits the fluid to effect operation of the piston 13 of servomotor 10 to position rudder 11. Simultaneously the movement of pistion 13 through the follow-up connection 28 recenters the valve 19. The displacement of rudder 11 is therefore in accordance with the rate of change of heading of the craft and serves to check the inherent tendency of the aircraft to yaw and thus provides dynamic stabilization.

During the above stabilization operation, any unbalance of the second network 86 results in a difference of potential between slider 90 and slider 113. Slider 90 is connected through conductor 130, conductor 151, out-contact 149, relay arm 148, conductor 150, to input connection 144 of amplifier 141. Conductor 113 is connected through conductor 116 to ground which is common to the ground connection 145 of amplifier 141. The amplifier 141 effects operation of motor 133 which positions slider 93 to rebalance the second network 86.

Should the pilot desire to change heading directly, he positions operator 29 to effect operation of the hydraulic motor 10. It will be evident that the rate of turn gyroscope 63 opposes this manually induced change of heading and its adjustment of slider 61 is followed automatically by motor 35 moving slider 49. Consequently the pilot must displace the operable rod 29 an additional amount in order to compensate for the movement of the rack 30 induced by precession of rate gyroscope 63. Upon cessation of turning, the spring 85 tends to return the precessed gyro rotor 76 to its normal position, thereby returning slider 61 to the center of resistor 60. The first network 45 is reversely unbalanced due to slider 49 being displaced and motor 35 rotates in the opposite direction to return slider 49 and rack 30 to their normal positions.

With the manual operator having been positioned to select a new heading, it may be desirable to automatically maintain the craft on this heading. Automatic heading control is introduced by operating engage switch 155. Closing of switch 155 energizes as stated the operating coils 65 and 147 of relays 64 and 146. Additionally closing switch 155 extends this energizing circuit which includes switch 155, conductor 167, switch 157, conductor 168, transmission device 95, to ground and to ground of battery 156.

Operation of relay coil 65 in effect places the variable resistor 70 across the slider 61 of potentiometer 59 and the center tap of secondary winding 62 as a voltage divider, and additionally connects slider 61 by means of conductor 68, relay arm 67, in-contact 154, conductor 152, and conductor 130 to slider 90 of potentiometer 88. Thus relay 64 serves additionally to connect the first network 45 and the second network 86 in series relationship whereby they jointly control the dynamic damper amplifier 40. The operation of relay 146 breaks the input circuit for controlling amplifier 141 thus motor 133 becomes disabled from operating slider 93.

Should the aircraft due to an external transient disturbance change its heading, such change in heading is detected by the directional gyroscope 96 which through transmission means 95 effects operation of slider 90. Additionally the rate of turn gyroscope 63 responds to the rate of turn of the craft and positions slider 61 along resistor 60. The amplifier 40 operates in response to the displacement and rate of displacement signals and effects rotation of motor 35 to operate slider 49 to rebalance the joint or series connected networks. Additionally the motor 35 operates through the pinion 32 and rack 30 transmission arrangement 23 to control valve 19 of servomotor 10 to displace the rudder 11.

When the craft has reached its maximum deviation from the selected heading and returns toward a normal position, the rate of turn of the aircraft is in an opposite direction from that formerly encountered due to the disturbance, and therefore the slider 61 is moved in an opposite direction to derive a signal which opposes the displacement signal from slider 90. While the decreasing displacement signal from slider 90 would tend to move the rudder back to its normal position, the opposite signal from slider 61 due to precession of gyroscope 63 tends to accelerate this return of the control surface to its normal position. Thus as the craft in its recovery from the deviation nearly regains its original position, the signal from the rate gyroscope 63 may be of such value as to induce an opposite displacement of the rudder 11 thereby to check any tendency of the craft to move beyond the selected heading.

If desired, the heading of the craft may be selectively altered through the automatic pilot by operating the turn control slider 110. Operation of slider 110 rotates the disc 153 to break the circuit to transmission device 95. The gyroscope 96 is thus disabled from operating slider 90, and the signal from the displacement of slider 110 unbalances the series connected networks 45, 86 to effect through amplifier 40 and motor 35 the operation of the valve 19 of hydraulic servomotor 10 and a resulting rudder movement to change craft heading. The gyroscope 63 opposes this change of heading and modifies the amount of rudder displacement originally obtained from the displacement of slider 110 manually. When the desired heading is approached, the slider 110 is manually repositioned, and the rate of turn gyroscope 63 provides an opposite rudder displacement which prevents the craft from going beyond the selected heading.

It will now be apparent that there has been provided means for stabilizing an aircraft by displacing a control surface thereof which means is responsive to the dynamic movements of said aircraft about the axis to be controlled due to the inherent instability of said craft about said axis. Further that such arrangement functions when the craft is being directly manually controlled, when no automatic stabilization to offset inherent instability would otherwise be provided, and also when it is being controlled through an automatic pilot to effect a damping action to impede movements of the craft from a selected heading. While one embodiment of the invention has been disclosed, it is to be understood that such is for illustrative purposes only.

What is claimed is:

1. Control apparatus for a dirigible craft having a control surface, said apparatus comprising: servo means for operating said surface; an electric motor for controlling said servo means; means responsive to rate of turn of said craft for operating said motor; means responsive to change in heading for producing a first voltage, a rebalancing motor; means driven by said rebalancing motor for supplying a second voltage; a control means for said rebalancing motor responsive to a difference of said first and second voltages, and selective means for rendering said first and second voltages ineffective on said control means and additionally controlling said electric motor from said first or heading change responsive means voltage and said second or rebalancing motor voltage.

2. Control apparatus for an aircraft having a rudder, said apparatus comprising: a hydraulic servomotor having a control valve for operating said valve; manually operable means for directly actuating said linkage for controlling said motor to change craft heading; an electric motor having a movable member operatively connected to said linkage for additionally controlling said servomotor; means responsive to rate of change of heading for generating a signal; signal operated means controlled by said signal for effecting operation of said electric motor; a craft heading change device for generating a signal; means for preventing said craft heading responsive device from generating a signal during manual changes in course; and means for additionally controlling said signal operated means from said heading change device to maintain the craft on the manually selected heading.

3. Control apparatus for operating a control surface of an aircraft comprising: a hydraulic servomotor for operating said surface; means responsive to rate of turn of said aircraft about an axis; an electric motor for controlling said servomotor; signal responsive means for controlling said electric motor; a balanceable network for operating said signal responsive means on unbalance thereof; a signal generator operated by said rate responsive means; a rebalance signal generator operated by said electric motor; both of said generators being included in said network; a second balanceable network; position maintaining means responsive to movement of said craft about said axis; a network rebalancing motor; a second signal responsive means for operating said rebalancing motor; a pair of signal generators in said second network, one being operated by said position maintaining means, the other by said rebalancing motor; manual means for controlling said hydraulic servo to change the position of said craft about said axis with said control modified by said rate of turn means; and means for connecting said second network to said second signal responsive means during such manually controlled change in position.

4. The apparatus as set forth in claim 3, with means for rendering said positioning means ineffective to operate its signal generator during manually controlled changes in heading.

5. The apparatus of claim 3, with means for connecting said two networks in series relation, and rendering said second signal responsive means inoperative during said connection.

6. In control apparatus for an aircraft having a motor means for operating the rudder of said craft, and a mechanical differential device for controlling the motor means: manually operable means operatively connected to one part of said device for controlling said motor means; mechanism connected to another part of said device for selectively controlling said motor means; said mechanism including attitude reference means responsive to variations in attitude of said craft, rate of attitude change responsive means, servo means controlled by said attitude reference means and said rate of attitude change responsive means for maintaining said craft in a selected attitude; means in said mechanism for varying the attitude at which said attitude reference means and servo means maintain said craft; and means for disabling said attitude reference means from controlling craft attitude during control of said differential device for said motor means by said manually operable means and controlling said servo means from said rate of attitude change responsive means.

7. In control apparatus for an aircraft having a control surface for positioning said craft about an axis and having a hydraulic motor means for operating said surface, with a mechanical differential device for positioning a control valve for the hydraulic motor means said apparatus comprising manual means for controlling said motor means; in combination, a balanceable network having a signal generator operated on change in position of said craft about said axis and a network rebalancing signal generator; a first control means selectively responsive to both said signals for actuating said rebalancing signal generator; a second balanceable network having a signal generator operated in accordance with the rate of change in position about said axis and a second network rebalancing signal generator; a second control means responsive to unbalance of said second network for operating said second network rebalancing generator and operatively connected to said differential for concurrently controlling said motor means; and means for connecting said networks in series relation and rendering said first control means ineffective to actuate said rebalancing signal generator, to maintain a selected position of said craft about said axis.

8. Apparatus for controlling the heading of an aircraft having a motor means for operating a rudder control surface of said craft which motor means has a mechanical differentially operable control device that may be directly manually operated from the control column of the craft, power apparatus for also operating said control device, said power apparatus comprising: signal responsive servo means operatively connected to said control device for additionally controlling said control surface motor means; heading responsive means for generating a signal in accordance with the magnitude and direction of change in heading; manual means for producing a heading selection signal; a balanceable signal combining network for operating said signal responsive servo means; means responsive to the rate of change of craft heading for generating a rate signal; a follow-up signal generator operated by said signal responsive servo means; means for selectively controlling said signal responsive servo means solely from said rate responsive means signal and said follow-up signal; and means for maintaining said heading responsive signal generator ineffective and for equally opposing said manual heading signal during such selective control of said signal responsive servo means.

9. In control apparatus for an aircraft having a control surface power means said power means having a controller that may be directly manually operated, means for selectively controlling the heading of said craft in accordance with a plurality of signals comprising a heading responsive device for supplying a first voltage signal varying with heading of the craft; means for producing a second variable voltage signal; a motor means controlled by said first and second voltage signals; driving connections from said motor means to said second variable voltage producing means and to said controller for said power means; means for rendering said heading responsive device ineffective to produce a voltage during manual operation of said controller; means responsive to rate of turn of said craft for producing a third variable voltage signal; and means for automatically applying a portion of said rate voltage to said motor means while said heading responsive device generates a signal voltage and for applying the full rate voltage signal to said motor means while said heading responsive device is made ineffective to generate a voltage signal.

ROBERT J. KUTZLER.
DANIEL G. TAYLOR.

References Cited in the file of this patent

UNITED STATES PATENTS

| Number | Name | Date |
| --- | --- | --- |
| 2,423,336 | Moseley | July 1, 1947 |
| 2,464,629 | Young | Mar. 15, 1949 |
| 2,516,641 | Murphy | July 25, 1950 |
| 2,561,873 | Kutzler | July 24, 1951 |